United States Patent [19]
Kondo

[11] Patent Number: 5,224,004
[45] Date of Patent: Jun. 29, 1993

[54] TAPE CASSETTE HAVING REELS DISPLACEABLE TOWARDS THE REAR CORNERS

[75] Inventor: Yoshio Kondo, Tokyo, Japan
[73] Assignee: Sony Corporation, Tokyo, Japan
[21] Appl. No.: 674,975
[22] Filed: Mar. 26, 1991

[30] Foreign Application Priority Data

Mar. 30, 1990 [JP] Japan .................................. 2-84307

[51] Int. Cl.$^5$ ................................................ G11B 23/087
[52] U.S. Cl. .................................... 360/132; 242/199
[58] Field of Search ............................ 360/132, 94; 242/197–201

[56] References Cited

U.S. PATENT DOCUMENTS 4,470,560 9/1984 Yoneya et al. ................. 242/198
4,490,757 12/1984 Moji ................................. 360/94

OTHER PUBLICATIONS

Patent Abstracts of Japan, vol. 7-No. 172, p. 75, Kokai-No. 58-77076 May 10, 1983.

*Primary Examiner*—Stuart S. Levy
*Assistant Examiner*—Craig A. Renner
*Attorney, Agent, or Firm*—Jay H. Maioli; Lewis H. Eslinger

[57] ABSTRACT

A tape cassette comprises a housing and a pair of reels mounted for rotation and translation in the housing so that the reels can assume either of first and second relative positions. A recording tape is wound on the reels and extends therebetween for transport from one of the reels to the other. The housing is formed with an opening through which a transducer can gain access to the recording tape for recording or reproducing signals on or from the recording tape. The reels in the first relative position conformed to a first arrangement of a drive for driving the reels in rotation and afford a predetermined amount of space for accommodating a transducer within the housing for access to the recording tape and in the second relative position correspond to a second arrangement of a drive for driving the reels in rotation and afford an additional amount of space for accommodating a transducer within the housing for access to the recording tape. The translation in accordance with the invention has a component parallel to a left-to-right direction of the housing as well as a front-to-back direction of the housing, so that the reels in the second position are displaced towards the rear corners of the tape cassette.

7 Claims, 9 Drawing Sheets

TAPE CASSETTE HAVING REELS DISPLACEABLE TOWARDS THE REAR CORNERS

BACKGROUND OF THE INVENTION

1. Field of the Invention

The present invention relates to tape cassettes and more particularly to a novel and highly effective tape cassette for use in a magnetic recording and reproducing device such as a videotape recorder, the tape cassette having a tape wound in coils of small diameter so that a magnetic recording and reproducing device that employs the tape cassette may be of a reduced size.

2. Description of the Prior Art

There have been proposed tape cassettes for use in magnetic recording and reproducing devices such as videotape recorders (VTRs), the tape cassettes being designed particularly for recording information during a relatively short period of time. The proposed tape cassettes have a cassette housing that accommodates a magnetic tape wound in coils of small diameter, thereby enlarging a mouth in which a head drum and related portions of a cassette player can be partially inserted, so that the magnetic recording and reproducing device may be reduced in size. Reference should be made to Japanese laid-open patent publication No. 60(1985)-171684 and Japanese utility model application No. 62(1987)-14573 filed by the assignee of the present application.

One such tape cassette for recording information in a short period of time is schematically shown in FIG. 9 of the accompanying drawings. In FIG. 9, the tape cassette has a cassette housing 51 accommodating a pair of rotatable tape reels 52, 53 with a magnetic tape T wound therearound. The magnetic tape T has a portion unreeled from the tape reels 52, 53 and guided by semi-cylindrical guides 54a, 54b disposed in spaced positions at the front of the cassette housing 51, the unreeled tape portion being kept taut and exposed in a front opening in the cassette housing 51. The cassette housing 51 has a mouth (opening) 55 formed in a lower panel of the cassette housing 51 between and somewhat forward of the tape reels 52, 53.

The diameter of the tape reels 52, 53 is smaller than the reel diameter of a conventional, standard tape cassette, and therefore the mouth 55 is correspondingly larger.

When the tape cassette is in use, the magnetic tape T is withdrawn forwardly from the cassette housing 51 by tape withdrawal guides 60a, 60b in the magnetic recording and reproducing device, and a head drum 61 and various tape transport members 62 including an impedance roller 63, tape guides 64, 65, 66, loading posts 67, 68, a capstan 69, and a pinch roller 70 are inserted to the extent feasible into the mouth 55. The magnetic tape T is now wound or loaded around the head drum 61 for recording or reproducing signals on or from the magnetic tape T.

Since the tape reels 52, 53 are smaller in diameter and the mouth 55 is correspondingly larger than in earlier tape cassettes of the same general construction, the head drum 61 and the tape transport members 62 can be inserted deeply into the cassette housing 51. As a result, the magnetic recording and reproducing device may be made small.

However, the increase in the size of the mouth is slight since only the diameter of the tape reels is reduced in the conventional tape cassette for recording information during a relatively short period of time. This limits efforts to reduce the size of the magnetic recording and reproducing devices.

In a conventional tape cassette, the cassette housing contains unused space near the rear corners of the tape reels; the space in the cassette housing of the conventional tape cassette is thus not effectively utilized.

OBJECTS AND SUMMARY OF THE INVENTION

In view of the drawbacks of the conventional tape cassette outlined above, it is an object of the present invention to provide a tape cassette that includes a cassette housing whose internal space is more effectively utilized to define an enlarged mouth in the cassette housing.

Another object of the invention is to provide a new type of tape cassette that can be used in cooperation with a conventional recording/reproducing apparatus and that is also compatible with a new type of recording/reproducing apparatus dedicated to use in combination with the new type of tape cassette.

A particular object of the invention is to provide an 8-mm tape cassette that has an interior construction that makes it possible to reduce the size of a camcorder with which it cooperates.

The foregoing and other objects of the invention are attained by the provision of a tape cassette comprising: housing means; a pair of reels; means mounting both of the reels for rotation and at least one of the reels for translation in the housing means, so that the reels can assume either of first and second relative positions; and a recording medium wound on the reels and extending therebetween for transport from one of the reels to the other; the housing means being formed with an opening through which transducer means can gain access to the recording medium for recording or reproducing signals on or from the recording medium; the reels in the first relative position conforming to a first arrangement of drive means for driving the reels in rotation and affording a predetermined amount of space for accommodating transducer means within the housing means for access to the recording medium and in the second relative position conforming to a second arrangement of drive means for driving the reels in rotation and affording an additional amount of space for accommodating transducer means within the housing means for access to the recording medium; and the translation having a component parallel to a left-to-right direction of the housing means.

In accordance with an independent aspect of the invention, an 8-mm tape cassette is provided comprising: housing means having at least first and second side walls; first and second reels; means mounting the reels for rotation in the housing means about respective first and second axes; and a recording medium wound on the reels and extending therebetween for transport from one of the reels to the other; the housing means being formed with an opening through which transducer means can gain access to the recording medium for recording and reproducing signals on or from the recording medium; and the housing means having the shape of a rectangular paralellepiped measuring substantially 95 mm×63 mm×15 mm, the first axis being less than 25 mm from the first side wall, thereby affording, as compared to a standard 8 mm tape cassette having a side wall and a reel with an axis of rotation substantially 25 mm therefrom, and additional amount of space for accommodating transducer means within the housing means for access to the recording medium.

In accordance with another independent aspect of the invention, there is provided an 8-mm tape cassette comprising: housing means having at least a rear wall and first and second side walls; first and second reels; means mounting the reels for rotation in the housing means about respective first and second axes; and a recording medium wound on the reels and extending therebetween for transport from one of the reels to the other; the housing means being formed with an opening through which transducer means can gain access to the recording medium for recording or reproducing signals on or from the recording medium; and the housing means having the shape of a rectangular parallelepiped measuring substantially 95 mm×63 mm×15 mm, each of the axes being less than 26 mm from the rear wall, the first axis being less than 25 mm from the first side wall, and the second axis being less than 25 mm from the second side wall, thereby affording, as compared to a standard 8-mm tape cassette having a rear wall and first and second side walls, a first reel with an axis of rotation substantially 26 mm from the rear wall and 25 mm from the first side wall, and a second reel with an axis of rotation substantially 26 mm from the rear wall and 25 mm from the second side wall, an additional amount of space for accommodating transducer means within the housing means for access to the recording medium.

When the tape cassette according to the present invention in its preferred embodiment is in its "normal" condition, the tape reels are in the same position as the tape reels of a conventional standard tape cassette, and the mouth is relatively small. The tape cassette is then compatible with a conventional cassette player. When the tape cassette is in use in a cassette player of a new design as disclosed herein and claimed in a copending application of Yoshio Kondo and Kenichi Fukahori, Ser. No. 07/674,977 filed concurrently herewith, assigned to the assignee of the present invention, and entitled "Magnetic Recording and Reproducing Device," the tape reels are moved or retracted towards the rear corners of the cassette housing, thereby enlarging the mouth. Thus, a head drum and other members can be inserted more deeply into the cassette housing. As a consequence, the recording and reproducing device which employs the tape cassette may be of a smaller size than has heretofore been achievable.

Other objects, features and advantages of the invention will become apparent from a consideration of the following detailed description of the preferred embodiment of the invention, in conjunction with the appended figures of the drawing, wherein a given reference character always represents the same element or part.

DESCRIPTION OF THE PREFERRED EMBODIMENTS

Figure 1:
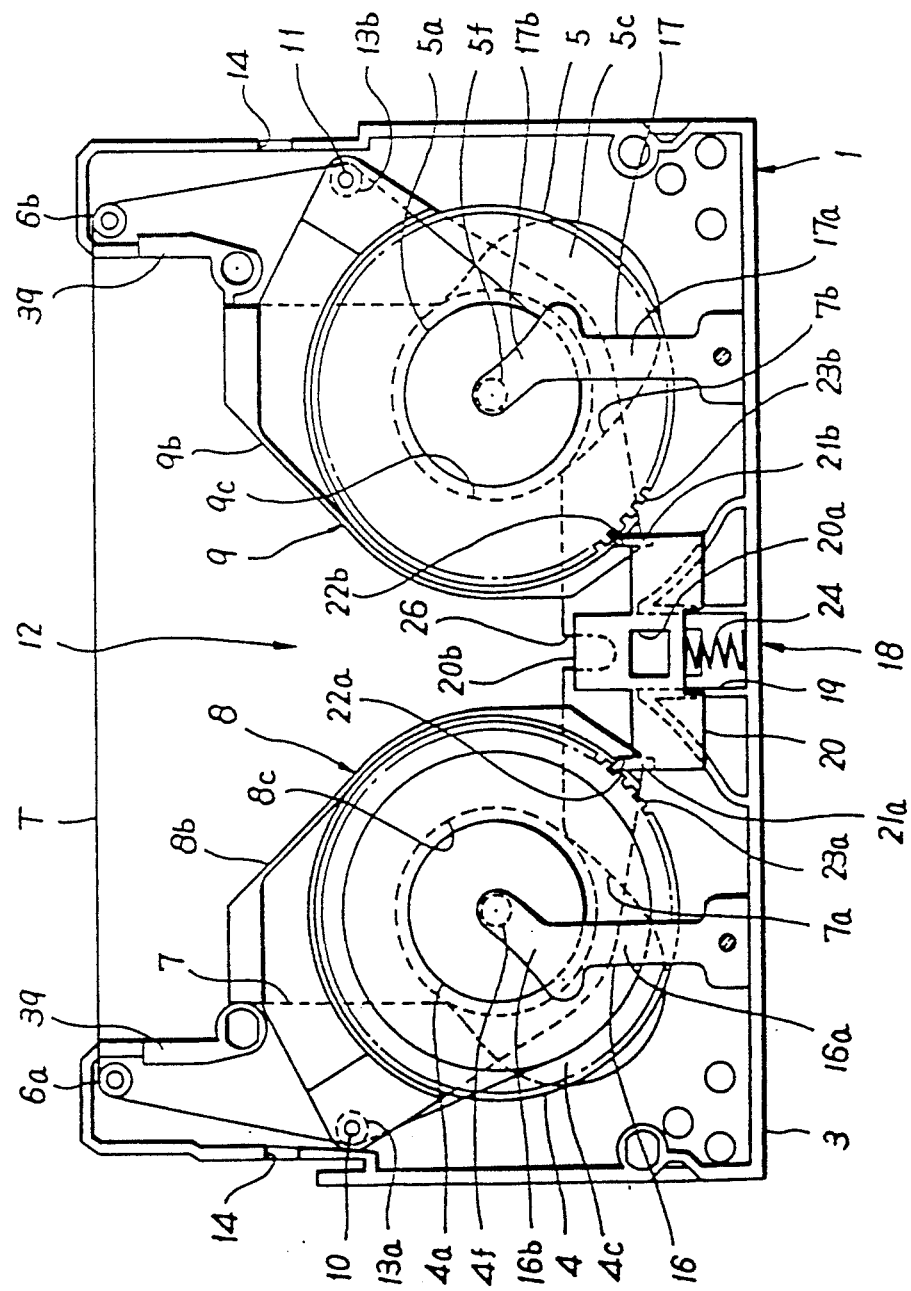
FIG. 1 is a top plan view of a tape cassette according to the present invention, an upper housing portion of the tape cassette being omitted for clarity, the tape cassette being in a "normal" state in which it is capable of cooperating with a standard cassette player, and the tape reels being locked against rotation.

An embodiment of the present invention is described in detail below with reference to FIGS. 1-8.

A tape cassette according to the present invention has a cassette housing 1 comprising an upper portion 2 and a lower portion 3 that are joined together in any conventional manner, for example by screws.

The cassette housing 1 has an outer configuration and dimensions according to the internationally agreed-upon 8-mm video standards. The cassette housing 1 is thus in the shape of a rectangular parallelepiped measuring approximately 95 mm×63 mm×15 mm.

The upper and lower housing portions 2, 3 of the cassette housing 1 accommodate therein a pair of rotatable tape reels 4, 5 with a magnetic tape T wound therearound. The magnetic tape T has a portion unreeled from the tape reels 4, 5 and guided by roller guides 6a, 6b disposed in spaced positions at the front of the lower housing portion 3. The unreeled tape portion is kept taut and can be exposed in a front opening formed in the cassette housing 5.

Figure 6:
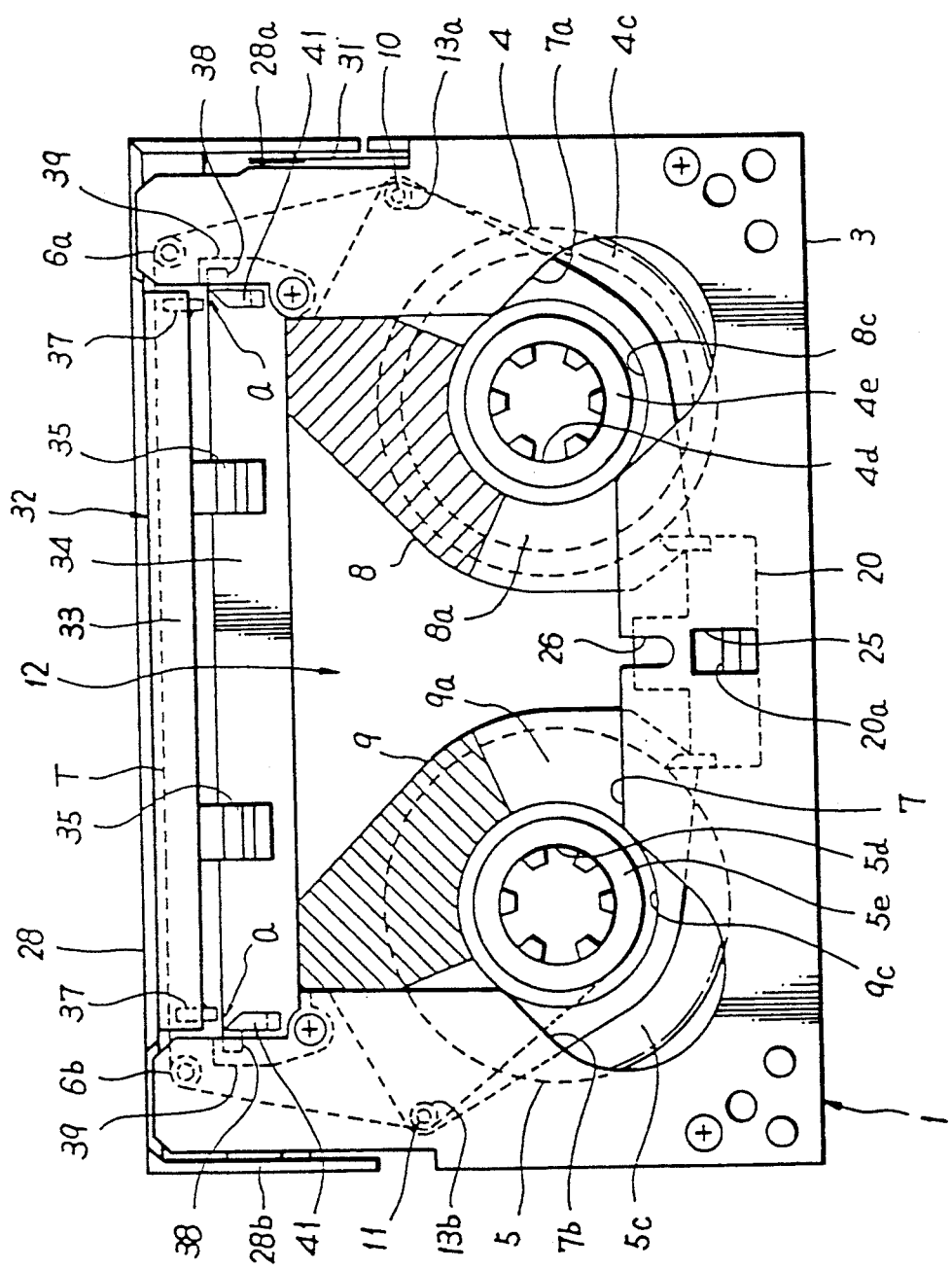
FIG. 6 is a bottom plan view of the tape cassette.
Figure 7:
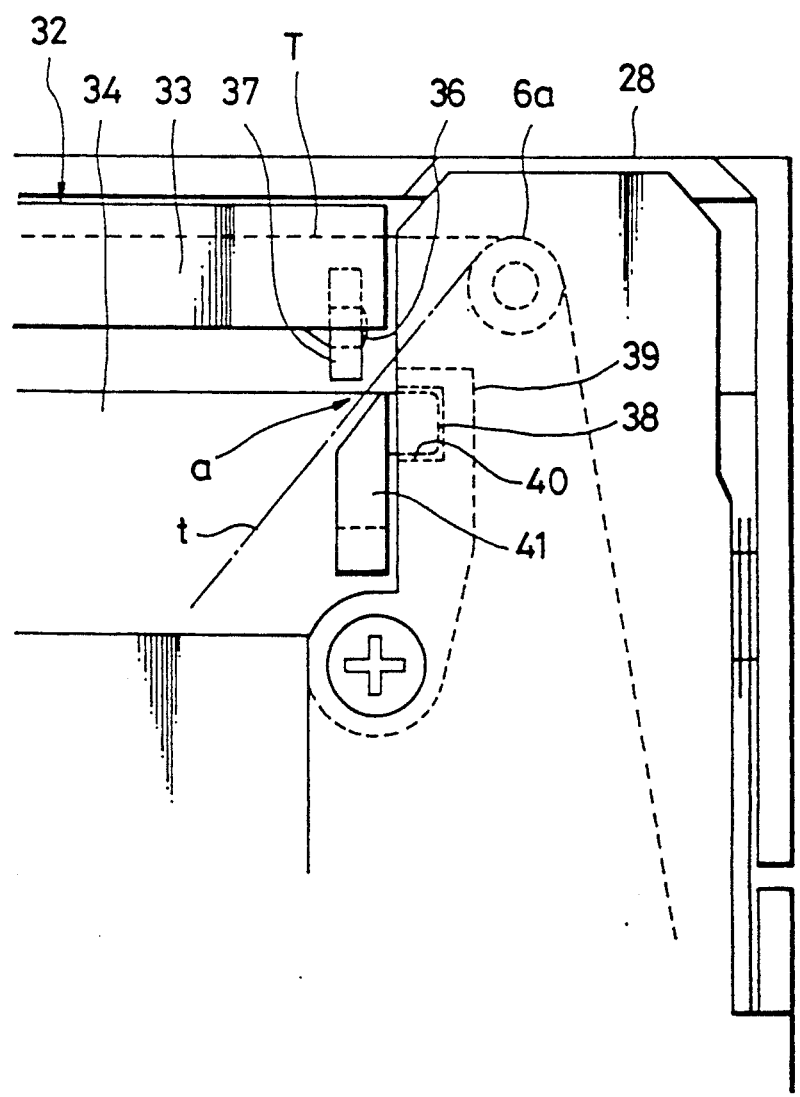
FIG. 7 is an enlarged fragmentary plan view of a portion of the tape cassette.
Figure 8:
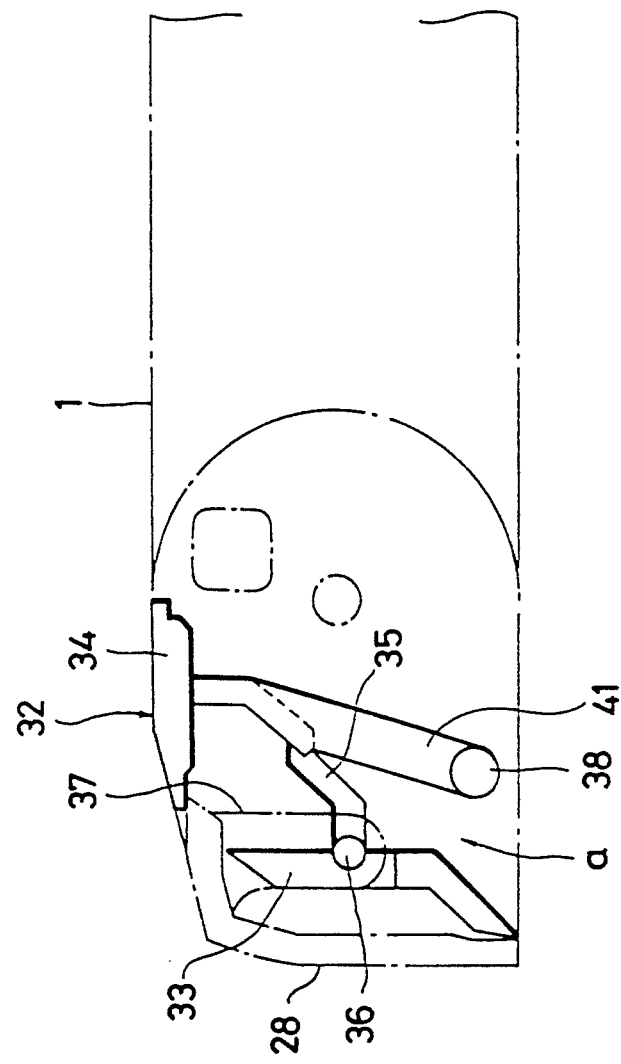
FIG. 8 is an enlarged side elevational view illustrative of a back lid of the tape cassette.

The tape reels 4, 5 have respective hubs 4a, 5a around which the magnetic tape T is wound, and respective pairs of upper and lower flanges 4b, 4c and 5b, 5c for guiding upper and lower edges of the tape T around the hubs 4a, 5a and maintaining the upper and lower edges of the tape coils in a smooth, flat condition. As FIG. 6 shows, the tape reels 4, 5 have central reel shaft insertion holes 4d, 5d, respectively, formed therein and opening downwardly.

The upper and lower tape reel flanges 4b, 4c and 5b, 5c of the tape reel 4, 5 have a diameter smaller than that of tape reel flanges of a standard tape cassette. Therefore, the magnetic tape T wound around the tape reels 4, 5 is shorter than the magnetic tape in a standard tape cassette. For example, the magnetic tape T can record or reproduce information during a period of time ranging from 30 to 60 minutes.

The tape reels 4, 5 are movable in translation in the cassette housing 1 between a normal position which is determined by the 8-mm video standards and a retracted position near the rear wall of the cassette housing 1.

A mechanism enabling movement of the tape reels 4, 5 between the normal and retracted positions in the tape cassette 1 is constructed as follows:

The lower panel of the lower housing portion 3 has a large recess 7 formed behind the portion of the magnetic tape T which extends under tension between the roller guides 6a, 6b. A pair of reel holders 8, 9 is disposed above the recess 7 in the cassette housing 1. The reel holders 8, 9 are supported for angular movement on laterally spaced opposite sides of the cassette housing 1 by respective support shafts 10, 11. The angular movement has a component in a transverse (i.e., front-to-back) direction of the cassette housing 1 and also has an improvement in the lateral (i.e., left-to-right) direction of the cassette housing. The tape reels 4, 5 are rotatably supported respectively on the reel holders 8, 9. The reel holders 8, 9 comprise respective support plates 8a, 9a on which the respective tape reels 4, 5 are placed, and respective shield walls 8b, 9b disposed in covering relation to front and inner sides of the tape reels 4, 5, respectively. The support plates 8a, 9a have respective holes 8c, 9c formed therein. As FIG. 6 shows, the tape reels 4, 5 have respective annular ridges 4e, 5e projecting downwardly from the bottoms thereof and extending around the edges of the reel shaft insertion holes 4d, 5d. The annular ridges 4e, 5e are loosely fitted respectively in the holes 8c, 9c.

A mouth 12 for inserting a head drum and tape loading members therein for recording signals on and reproducing signals from the magnetic tape T is formed between and in front of the shield walls 8b, 9b of the reel holders 8, 9. When the reel holders 8, 9 are angularly moved, the tape reels 4, 5 are moved (i.e., translated), thereby varying the size of the mouth 12.

The lower panel of the lower housing portion 3 also has a pair of recesses 7a, 7b formed therein in alignment with the holes 8c, 9c of the reel holders 8, 9 and contiguous with the recess 7. The recesses 7a, 7b extend along paths defined by the swingable reel holders 8, 9.

The support plates 8a, 9a of the reel holders 8, 9 have surface areas (shown hatched in FIG. 6) exposed in the recess 7 and positioned so as to avoid physical interference with the lower housing portion 3 when the reel holders 8, 9 are turned. These surface areas are raised so as to lie flush with the lower surface of the lower panel of the lower housing portion 3. The raised surface areas serve as a positioning reference surface for positioning the tape cassette when the tape cassette is loaded into the magnetic recording and reproducing device.

Roller guides 13a, 13b are rotatably fitted respectively over the support shafts 10, 11. The magnetic tape T wound around the tape reels 4, 5 is guided over the roller guides 13a, 13b toward the roller guides 6a, 6b at the front of the cassette housing 1, and extends between the roller guides 6a, 6b in the front opening of the cassette housing 1.

The opposite side walls of the lower housing portion 3 and the shield walls 8b, 9b of the reel holders 8, 9 have through-holes 14a, 14b and 15 for passing therethrough beams of light for detecting the starting and finishing ends of the magnetic tape T. Only one of the through-holes 15 is visible in FIG. 5.

Reel presser springs 16, 17 in the form of leaf springs are mounted on the lower surface of the upper panel of the upper housing portion 2. The reel presser springs 16, 17 comprise respective arms 16a, 17a whose proximal ends are fixed to the upper housing portion 2, and respective pressers 16b, 17b contiguous with distal ends of the arms 16a, 17a, respectively, for pressing respective central projections 4f, 5f of the tape reels 4, 5. The pressers 16b, 17b are of an arcuate shape extending along the paths of travel of the tape reels 4, 5 as they are pivoted by the respective reel holders 8, 9. The presser springs 16, 17 press lightly against the tape reels 4, 5 to prevent wobbling of the reels.

The cassette housing 1 also houses in its rear portion a lock mechanism 18 for locking the tape reels 4, 5 and the reel holders 8, 9 against rotation. The lock mechanism 18 is constructed as follows:

The lock mechanism 18 includes a lock member 20 positioned centrally on the rear portion of the cassette housing 1. The lock member 20 is movable back and forth in a transverse (i.e., front-to-back) direction of the cassette housing 1, along a guide 19 disposed on the lower housing portion 3. The lock member 20 has a pair of fingers 21a, 21b projecting forwardly from laterally spaced opposite ends thereof.

The reel holders 8, 9 have respective slots 22a, 22b formed in rear ends thereof for receiving the respective fingers 21a, 21b of the lock member 20. The lower flanges 4c, 5c of the tape reels 4, 5 have engaging teeth 23a, 23b formed all around their outer circumferential edges, the engaging teeth 23a, 23b being engageable by the fingers 21a, 21b.

A coil spring 24 is mounted under compression between the lock member 20 and the rear side wall of the lower housing portion 1, for normally urging the lock member 22, i.e., the fingers 21a, 21b, in a forward direction to engage in the slots 22a, 22b of the reel holders 8, 9 and also engage the engaging teeth 23a, 23b of the tape reels 4, 5.

The lock member 20 has a central hole 20a formed therein, and the lower panel of the lower housing portion 3 has an insertion hole 25 (FIG. 6) formed therein in register with the hole 20a. When the tape cassette is loaded in a magnetic recording and reproducing device, as described later on, an unlocking member is inserted from the magnetic recording and reproducing device through the insertion hole 25 into the hole 20a of the lock member 20 to displace the lock member 20 out of locking engagement with the tape reels 4, 5.

The lower panel of the lower housing portion 3 has a groove 26 formed therein in front of the insertion hole 25 and extending rearwardly from the rear edge of the recess 7. When the tape cassette is loaded in the magnetic recording and reproducing device, an unlocking member is inserted from the magnetic recording and reproducing device through the groove 26 into the cassette housing 1 to push the front end 20b of the lock member 20 out of locking engagement with the reel holders 8, 9.

A front lid 34 is mounted for pivoting movement on the front end of the cassette housing 1 to selectively open and close the front opening of the cassette housing 1. When the front opening of the cassette housing 1 is closed by the front lid 34, the front lid 34 protects the face of the magnetic tape T which extends under tension between the roller guides 6a, 6b.

The front lid 34 has laterally spaced side walls 34a, 34b extending perpendicularly from the opposite ends of the front lid 34. The side walls 34a, 34b have respective horizontal shafts 35a, 35b projecting toward each other from inner surfaces thereof and received in respective holes 36 (only one of which is visible in FIG. 4) defined by recesses in the front ends of opposite side walls of the upper housing portion 2 in combination with front ends of opposite side walls of the lower housing portion 3. Therefore, the front lid 34 is angularly movable in a vertical plane about the shafts 35 with respect to the cassette housing 1. The front lid 34 is normally urged to turn in a closing direction to cover the face of the magnetic tape T by a torsion spring 37 coiled around one of the shafts 35. Upon loading the tape cassette in either the standard or the dedicated magnetic recording and reproducing device, the front lid 34 is turned upwardly by a lid opening mechanism in the magnetic recording and reproducing device, thereby exposing the magnetic tape T between the roller guides 6a, 6b.

A back lid 38 for protecting the back of the magnetic tape T between the roller guides 6a, 6b is disposed behind the front lid 34.

The back lid 32 comprises a back lid member 33 for covering the back of the magnetic tape T and an upper plate 34 for closing a cavity 2a formed in the upper panel of the upper housing portion 2. The cavity 2a receives the back lid member 33 when the back lid 32 is opened. The back lid member 33 and the upper plate 34 are joined to each other by joints 35a, 35b.

The back lid member 33 has shafts 36a, 36b on respective opposite side edges thereof, the shafts 36a, 36b being pivotally supported by respective supports 37a, 37b which project from the rear surface of the front lid 28. The back lid 32 is thus coupled to the front lid 28 for angular movement in a vertical plan. The back lid 32 also has engaging pins 38a, 38b projecting from respective opposite ends thereof. The engaging pins 38a, 38b are movably received in respective cam grooves 40 defined in the inner surfaces of vertical guide walls 39a, 39b respectively, which are located in laterally spaced positions in the front end of the lower housing portion 3. Only one of the cam grooves 4b is visible in Gis. 5 and 7. When the front lid 28 is opened or closed with respect to the cassette housing 1, the enging pins 38a, 38b are guided by and along the cam grooves 40 to cause the back lid 32 to be opened or closed in coordination with the front lid 28.

The tape cassette is constructed to allow the front lid 28 to be closed after a head drum and tape transport members are inserted into the mouth 12, drawing the magnetic into the mouth 12 so that the magnetic tape T will be loaded around the head drum.

More specifically, the back lid 32 has a pair of gaps 1, defined in the respective opposite sides thereof, for passage therethrough of the position of the magnetic tape T drawn in the mouth 12. Two arms 41a, 41b project downwardly from the opposite ends of the upper plate 34 of the back lid 32, and the respective engaging pins 38a, 38b project outwardly from respective lower ends thereof. The gaps a are defined between the arms 41a, 41b and the opposite ends of the back lid member 33, as shown FIGS. 7 and 8. The portion of the magnetic tape drawn in the mouth 12 passes through the taps a, as indicated by the dot-and-dash line in FIG. 7. Accordingly, the back lid 32, which moves in coaction with the front lid 28 does not physically interfere with the portion t of the magnetic tape T. The front lid 28 can thus be closed unobstructedly.

The guide walls 39a, 39b of the lower housing portion 3 have respective front edges retracted largely from the roller guides 6a, 6b, thus providing gaps between themselves and the front lid 28 when it is closed, so that the magnetic tape portion t drawn in the mouth 12 is held out of physical interference with the guide walls 39a, 39b.

The upper panel of the upper housing portion 2 has a pair of laterally spaced relief grooves 42a, 42b communicating with the cavity 2a, for receiving the respective arms 41a, 41b of the back lid 32 when the front lid 28 is opened.

The tape cassette thus constructed operates as follows:

Normally, the tape reels 4, 5 are held in respective positions prescribed according to the 8-mm video standards, as shown in FIG. 1. The fingers 21a, 21b of the lock member 20 engage respectively in the grooves 22a, 22b of the reel holders 8, 9 and also engage the respective teeth 23a, 23b of the tape reels 4, 5. The reel holders 8, 9 are locked against pivoting with the tape reels 4, 5 in the respective prescribed positions. The tape reels 4, 5 are locked against rotation.

Since the tape reels 4, 5 are normally in the predetermined positions according to the 8-mm video standards, the tape cassette can compatibly be used in the same manner as a general 8-mm video tape cassette without the use of any adapter.

Figure 2:
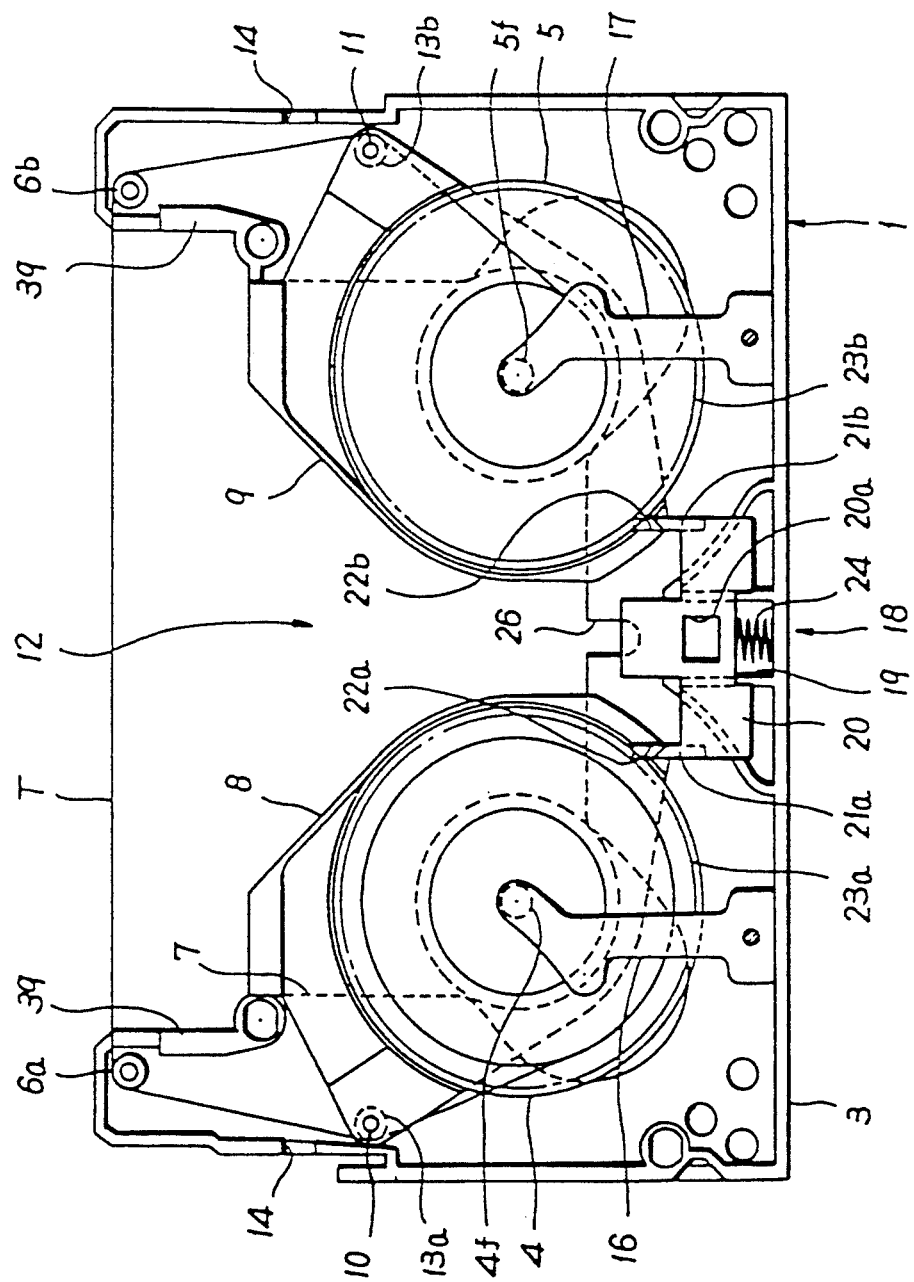
FIG. 2 is a view similar to FIG. 1, but showing the tape reels unlocked so that they can rotate.

When the tape cassette is loaded into a standard magnetic recording and reproducing device designed according to the 8-mm video standards, an actuating member (not shown) is inserted from the magnetic recording and reproducing device through the insertion hole 25 into the hole 20a of the lock member 20, thereby retracting the lock member 20 against the bias of the compression coil spring 24. The retracted movement of the lock member 20 causes the fingers 21a, 21b to be displaced out of locking engagement with the teeth 23a, 23b of the tape reels 4, 5, which are now unlocked for rotation, as shown in FIG. 2.

Upon use of the tape cassette in the standard magnetic recording and reproducing device, the fingers 21a, 21b of the lock member 20 are only moved out of locking engagement with the teeth 23a, 23b of the tape reels 4, 5; they remain in locking engagement in the grooves 22a, 22b of the reel holders 8, 9. Therefore, the tape reels 4, 5 are unlocked for rotation, but their axes of rotation remain in the standard prescribed positions with respect to the cassette housing 1. Accordingly, the tape cassette can compatibly be employed in the standard magnetic recording and reproducing device just as though it has a standard 8-mm video cassette.

When the tape cassette is loaded into a standard magnetic recording and reproducing device designed according to the 8-mm video standards, an actuating member (not shown) is inserted from the magnetic recording and reproducing device through the insertion hole 29 into the oblong hole 27a of the unlock block 27, thereby retracting the unlock block 27 toward the rear wall of the lower housing portion 3. Through its interaction with the post 28, the retraction of the unlock block 27 causes the lock member 22 to be also retracted. The locking arms 23a, 23b of the lock member 22 are therefore displaced out of locking engagement with the teeth 7a, 7b of the tape reels 4, 5, which are now unlocked for rotation, as FIG. 2 shows.

In the operation described above, the lock member 22 is movable only through distance corresponding to the length of the recess 21 of the reel-moving member 10. The reel-moving member 10 remains locked by the reel presser spring 30. Accordingly, the tape reels 4, 5 are unlocked for rotation, but stay in the positions conforming to the 8-mm video standards.

When the tape cassette is loaded into a dedicated magnetic recording and reproducing device as disclosed in the copending application identified above, the reel-moving member 10 is unlocked and moved by the actuating member 44 (FIG. 4) in the dedicated magnetic recording and reproducing device.

More specifically, the actuating member 44 has two actuating fingers 44a, 44b which are inserted through the respective insertion holes 33a, 33b into the cassette housing 1 to press the resilient lock member 30c upwardly toward the upper panel of the upper housing portion 2. The resilient lock member 30c is displaced upwardly out of locking engagement with the engaging step 32 of the reel moving member 10, which is now unlocked, as FIG. 6B shows.

Figure 3:
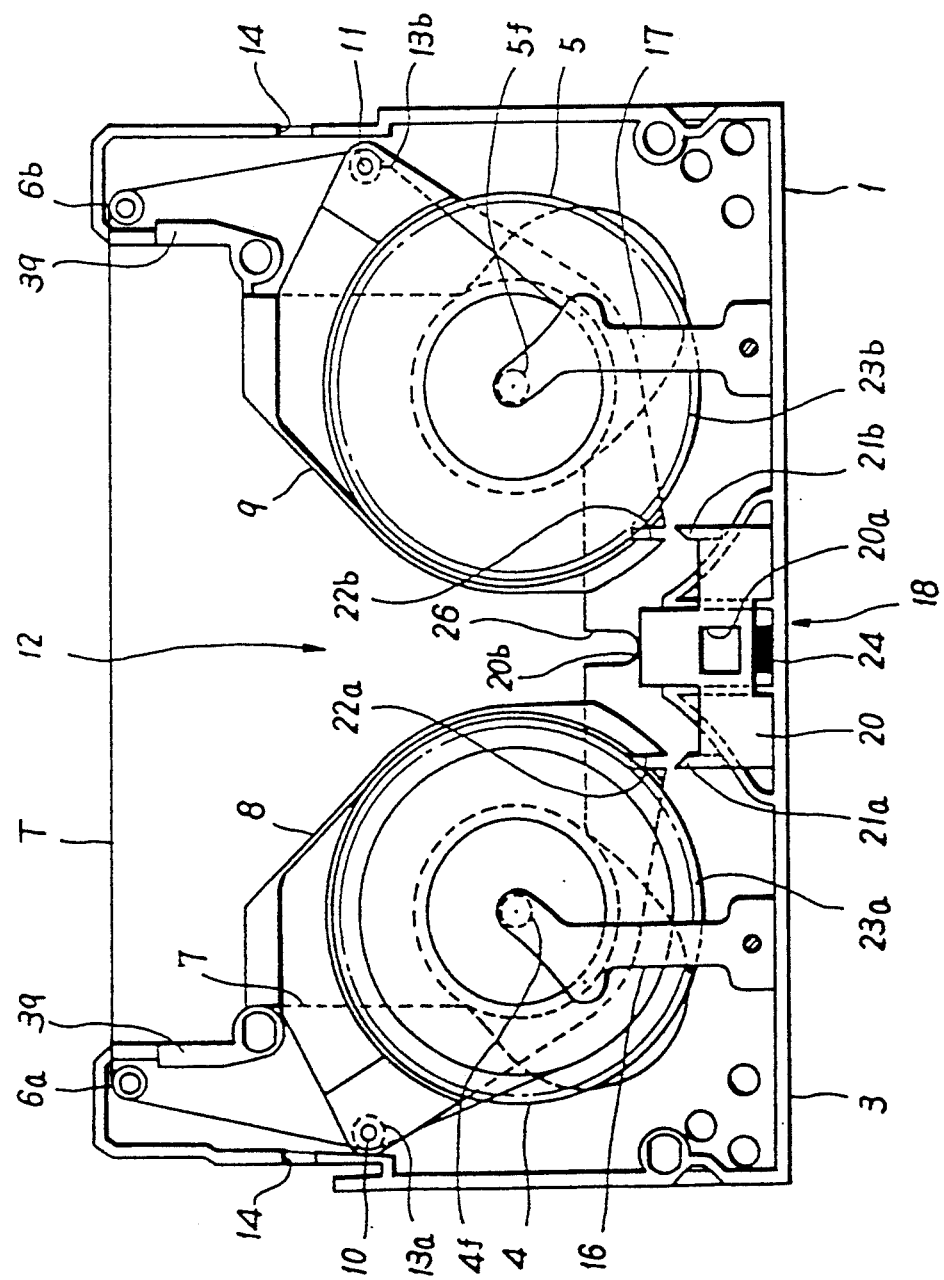
FIG. 3 is a view similar to FIG. 2, but showing the holders for the tape reels released for pivoting movement.

When the reel-moving member 10 is unlocked, the actuating member 44 is moved rearwardly to enable the actuating fingers 44a, 44b to engage and push the locking arms 23a, 23b of the lock member 22 rearwardly. The lock member 22 is thus retracted through a substantial distance, so that it pushes against the rear edge of the recess 21 of the reelmoving member 10. The reel-moving member 10 is therefore retracted in unison with the lock member 20, whereby the tape reels 4, 5 are moved parallel to each other towards the rear of the cassette housing 1. As a consequence, the mouth 14, whose rear end is defined by the reel-moving member 10, is enlarged as shown in FIG. 3.

The tape loading operation described above is carried out while the front lid 28 is being opened by a lid opening mechanism of the magnetic recording and reproducing device. Because all of the head drum 61 and the tape transport members 62 are accommodated completely in the mouth 12, the front lid 28 can be closed again after the magnetic tape T has been loaded around the head drum 61.

The gaps a formed at opposite ends of the back lid 22 enable passage of the magnetic tape T therethrough, as described above. The back lid 32 does not physically interfere with the magnetic tape T as it passes through the gaps a, making it possible to close the front lid 28 smoothly and reliably.

Figure 4:
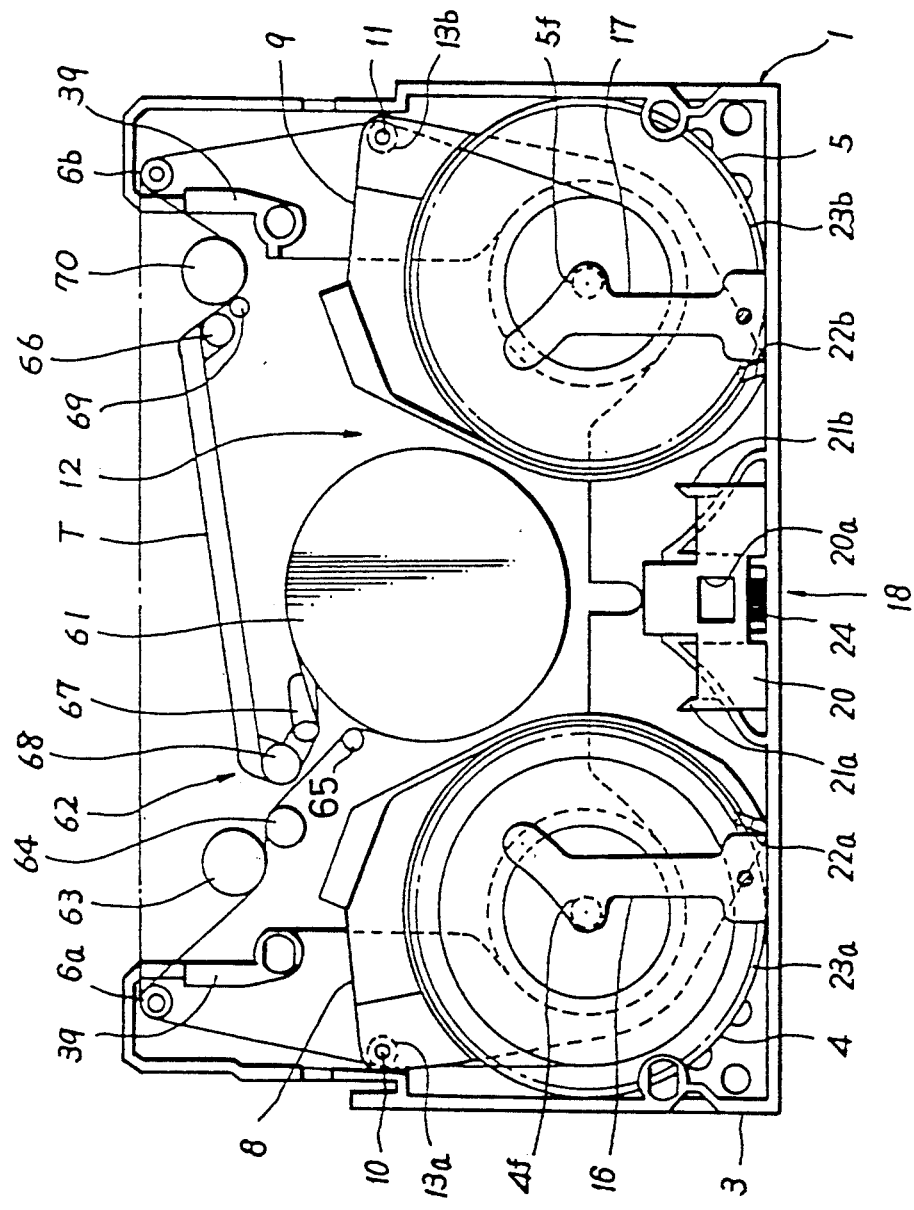
FIG. 4 is a view similar to FIG. 3, but showing the tape cassette in a modified state, in which it is capable of cooperating with a new type of cassette player dedicated to use with a tape cassette constructed in accordance with the present invention.
Figure 5:
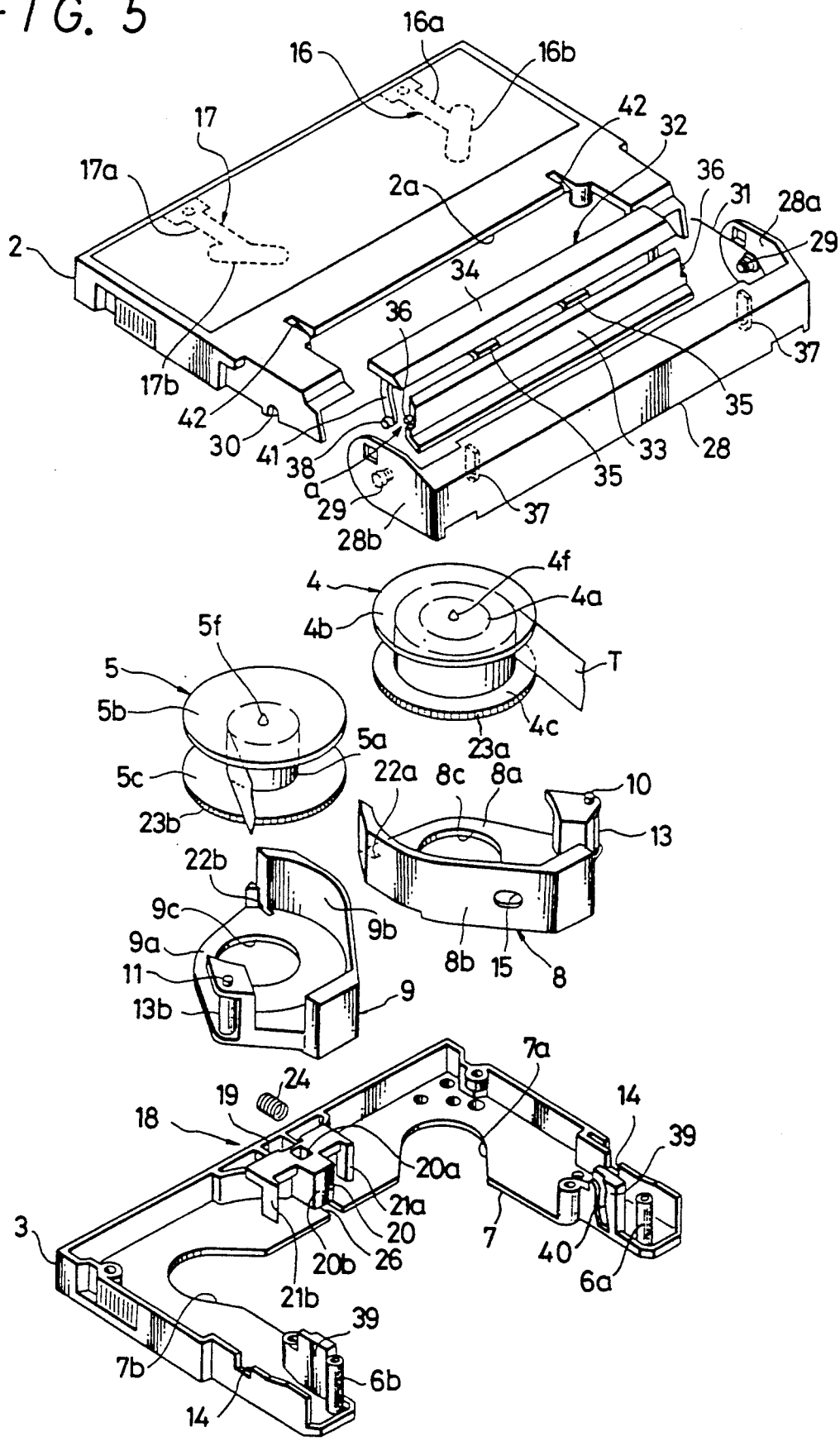
FIG. 5 is an exploded perspective view of the tape cassette.

Since the mouth 12 is substantially enlarged when the tape cassette is loaded in the dedicated magnetic recording and reproducing device, the head drum 61 and the tape transport members 62 can fully be accommodated in the mouth 12 when the tape loading operation is completed (See FIG. 4). While signals are being recorded on or reproduced from the magnetic tape T in the tape cassette, the head drum 61 and the tape transport members 62 in the magnetic recording and reproducing device are positioned along with the tape reels 4, 5 within a region which is of substantially the same size as the tape cassette. Moreover, as the front lid 28 can be closed after the tape loading operation is completed, the thickness of the magnetic recording and reproducing device can be reduced by the height that would be added if it were impossible to close the front lid 28.

As a result, the dedicated magnetic recording and reproducing device can be of a miniature size corresponding to the magnetic recording and reproducing device to the size of the tape cassette itself. In other words, it can be rendered much more compact than conventional magnetic recording and reproducing devices.

Furthermore, the roller guides 13a, 13b are fitted over the respective support shafts 10, 11 about which the reel holders 8, 9 are angularly movable, and the magnetic tape T is guided around the roller guides 13a, 13b into the front opening of the cassette housing 1. Even when the tape reels 4, 5 change their position upon angular movement of the reel holders 8, 9, therefore, the magnetic tape T is prevented from slackening and is reliably transported during use of the tape cassette.

Figure 9:
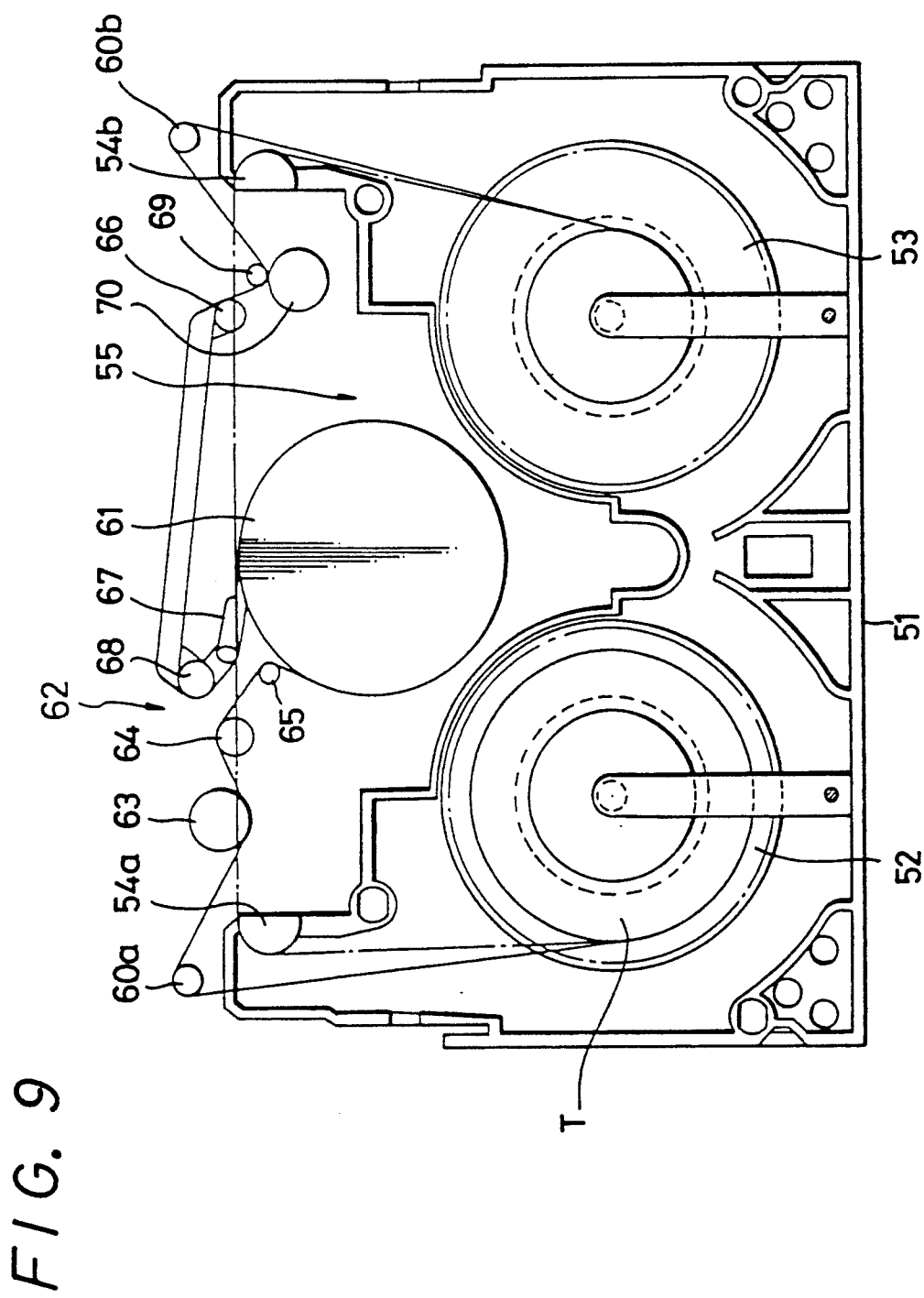
FIG. 9 is a top plan view of a conventional tape cassette.

The roller guides 6a, 6b are disposed on the opposite sides of the front opening of the cassette housing 1, and the guide walls 39a, 39b are spaced rearwardly from the roller guides 6a, 6b. When the magnetic tape T is to be loaded around the head drum 61, the magnetic tape T can smoothly be drawn into the mouth 12 without the need for the tape withdrawal guides 60a, 60b that are used in conventional tape cassettes, as described above in connection with FIG. 9. As a consequence, the number of components of the magnetic recording and reproducing device is reduced. This contributes further to the reduction in its size.

Moreover, the reel presser springs 16, 17 are shaped in conformity with the paths of travel of the tape reels 4, 5 in the cassette housing 1. The tape reels 4, 5 are thus held in position under constant forces irrespective of whether the tape reels 4, 5 are in the normal positions shown in FIG. 1 or on the retracted positions shown in FIG. 4. The tape reels 4, 5 can therefore be rotated stably at all times for smoothly transporting the magnetic tape T.

While the present invention has been described as being applied to an 8-mm video cassette, the principles of the present invention are also applicable to other tape cassettes for recording and reproducing information using rotary heads, such as a conventional ½-inch video cassette and a tape cassette for use in a DAT (digital audio tape recorder).

The tape cassette according to the present invention is compatible with players for conventional standard tape cassettes, yet has a mouth capable of enlargement to allow the head drum and the tape transport members to be inserted even more deeply into the cassette housing. The magnetic recording and reproducing device which employs the tape cassette according to the present invention may therefore be extremely small.

Many modifications of the preferred embodiment of the invention described above will readily occur to those skilled in the art upon consideration of this disclosure. For example, although it is highly desirable for both of the tape reels to be mounted for translation in the housing, it is not strictly necessary that both be so mounted in order to achieve some of the advantages of the present invention. Even if only one of the reels is movable to the rear, the recording/reproducing head or transducer can in principle be inserted more deeply into the mouth of the cassette by displacing it somewhat towards the side of the reel that is moved to the rear. The important point is simply that the reels be capable of assuming either of first and second relative positions and that the reels in the first relative position conform to a first arrangement of drive means for driving the reels in rotation and afford a predetermined amount of space for accommodating a transducer within the housing for access to the recording medium and in the second relative position conform to a second arrangement of drive means for driving the reels in rotation and afford an additional amount of space for accommodating a transducer within the housing for access to the recording medium.

It is also not essential that the new tape cassette of the present invention be compatible with standard, conventional tape cassette players. That is, it is possible in accordance with the invention to construct a tape cassette which fully conforms to the international standards (for example, the standards applicable to 8-mm tape cassettes) except that the tape reels are permanently "out of position" by being moved towards the rear wall of the tape cassette so that, instead of their centers being distant the normal 26 mm or so from the rear wall, they are less distant than 26 mm, or the center of at least one of the tape reels is distant less than 26 mm, and preferably both reels are approximately 21 mm from the rear wall.

Many other modifications of the preferred embodiment of the invention described above and illustrated in the drawings will readily occur to those skilled in the art. Accordingly, the invention is to be construed as including all embodiments thereof which fall within the scope of the appended claims.

I claim:

1. A tape cassette comprising:
   a housing;
   a pair of reels;
   means mounting both of said reels for rotation and at least one of said reels for translation in said housing, so that said reels assume either of first and second relative positions; and
   a recording medium wound on said reels and extending therebetween for transport from one of said reels to the other;
   said housing being formed with an opening through which transducer means can gain access to said recording medium for recording or reproducing signals on or from said recording medium;
   said reels in said first relative position conforming to a first arrangement of drive means for driving said reels in rotation and affording a predetermined amount of space for accommodating transducer means within said housing for access to said recording medium and in said second relative position conforming to a second arrangement of drive means for driving said reels in rotation and affording an additional amount of space for accommodating transducer means within said housing for access to said recording medium; and
   said translation having a component parallel to a left-to-right direction of said housing.

2. A tape cassette according to claim 1 wherein said translation also has a component parallel to a front-to-back direction of said housing.

3. A tape cassette according to claim 1 wherein said mounting means mounts both of said reels for translation in said housing.

4. A tape cassette according to claim 1 wherein said means mounts both of said reels for pivoting in said housing.

5. A tape cassette according to claim 4 wherein said mounting means comprises a pair of support shafts and a pair of roller guides rotatably fitted on said respective support shafts, said support shafts enabling pivoting movement of said recording medium being trained around said roller guides.

6. A tape cassette according to claim 4 wherein said reels are movable along arcuate paths, further comprising presser spring means having portions respectively extending along said paths and engaging said reels for preventing wobbling of said reels.

7. A tape cassette according to claim 1 further comprising detection means formed on said housing, said detection means being capable of cooperating with a cassette player employing either of said first and second arrangements of drive means and of detecting the arrangement of drive means employed; and
   means connected to said detection means for maintaining said first relative position of said reels in response to detection of said first arrangement of drive means and enabling translation to said second relative position of said reels in response to detection of said second arrangement of drive means.

* * * * *

UNITED STATES PATENT AND TRADEMARK OFFICE
CERTIFICATE OF CORRECTION

PATENT NO.   : 5,224,004
DATED        : June 29, 1993
INVENTOR(S)  : Yoshio Kondo It is certified that error appears in the above-indentified patent and that said Letters Patent is hereby corrected as shown below:

```
Col.  8, line 54, after "through" insert --a--
Col.  9, line 13, change "reelmoving" to --reel-moving--

Col. 12, line 11, after "said" insert --mounting--
```

Signed and Sealed this

Twenty-eighth Day of June, 1994

Attest:

BRUCE LEHMAN

*Attesting Officer*    *Commissioner of Patents and Trademarks*